Inventor
ELMER H. SMITH
By Paul, Paul & Moore
ATTORNEYS

UNITED STATES PATENT OFFICE 2,519,939

CUTTING TORCH

Elmer H. Smith, Minneapolis, Minn., assignor to Smith Welding Equipment Corporation, Minneapolis, Minn., a corporation of Minnesota Application November 23, 1945, Serial No. 630,217

2 Claims. (Cl. 158—27.4)

This invention relates to new and useful improvements in oxy-acetylene cutting torches such as commonly utilize a high pressure oxygen as the cutting medium.

In oxy-acetylene cutting torches it is important that the tip be so supported in the torch head that when the torch is in use the high pressure oxygen cannot leak into the low pressure fuel passages, which may materially interfere with the operation of the torch. As is well known, before the cutting operation can be started, the metal or work must be pre-heated, and this is usually done with the same torch head and tip by directing a pre-heating flame against the work until it is heated to a temperature which will support combustion, after which the usual control valve for the high pressure cutting oxygen is opened to permit the high pressure oxygen to flow thru the central bore or passage in the tip directly against the work, whereupon the actual cutting operation may be performed in the usual manner.

In a cutting torch the tip is usually removably supported in the torch head, and some difficulty has therefore been experienced in the operation of conventional cutting torches to prevent leakage of the high pressure oxygen into the low pressure fuel ducts or chambers because of failure of the sealing means in the torch head adequately sealing the joints between the tip and torch head within the torch head after a short period of use.

It is therefore an object of the present invention to provide in combination with a torch head and a tip, a novel sealing means whereby the high pressure oxygen cannot leak into the low pressure fuel ducts or chambers formed by the torch tip and torch head, when the torch is in operation, regardless of the number of times the tip may be detached from the torch head.

A further object of the invention is to provide a torch head having a chamber therein provided at its inner end with a reduced bore surrounded by a seat, and the torch tip having a reduced cylindrical portion adapted to be inserted into said bore whereby the central passage through the tip is in communication with a high pressure oxygen supply conduit, and a suitable packing being provided around the reduced cylindrical end portion of the tip adapted to be compressed between said seat and a member carried by the tip, thereby to positively prevent leakage of the high pressure oxygen within the torch head.

A further object is to provide in combination with a torch head and a tip adapted to be removably supported therein, a novel sealing means which is so fashioned and constructed that when the tip is inserted into the head and the usual securing nut is manipulated to secure the tip in the head, said sealing means will positively seal off the high pressure gas from the low pressure chambers without excessive wrench effort, and regardless of the rotative position of the tip in the torch head, said sealing means being so located within the torch head that it is not likely to become damaged when interchanging the tip in the head.

A further object is to provide a torch head having a chamber therein provided at its inner end with a reduced bore surrounded by a conical seat, and a cutting tip being removably supported in said head and having a reduced cylindrical end portion receivable in said reduced bore, and an annular member being mounted on the reduced cylindrical end portion of the tip in spaced relation from said seat, between which member and the seat, a plurality of flexible packing elements are interposed, and means being provided on the tip and engageable with said annular member to prevent axial movement thereof in one direction, whereby when the usual nut for securing the tip in position in the head is tightened, said sealing elements are compressed between said member and said seat in a manner to effect a positive seal between the exterior of the reduced cylindrical portion of the tip and the high pressure oxygen conduit for delivering high pressure oxygen to the central passage in the tip.

Other objects of the invention reside in the simple and inexpensive construction of the sealing means whereby it may readily be embodied in a torch head in such a manner that the tip may readily be removed therefrom when necessary, and when re-inserted in the head and secured in position therein, said sealing means is rendered effective to prevent leakage within the torch head; and in the means provided for retaining the sealing means in position in the torch head, when the tip is detached therefrom.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
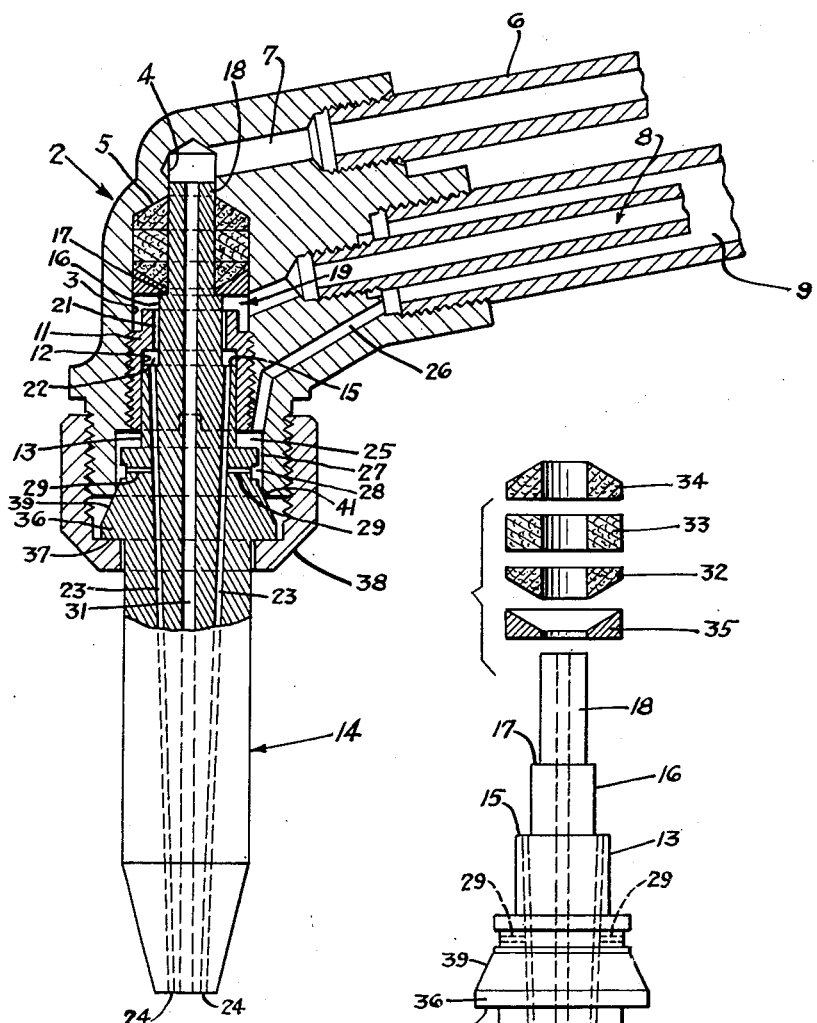
Figure 1 is a view partially in section showing a torch head and tip with the invention embodied therein.
Figure 2:
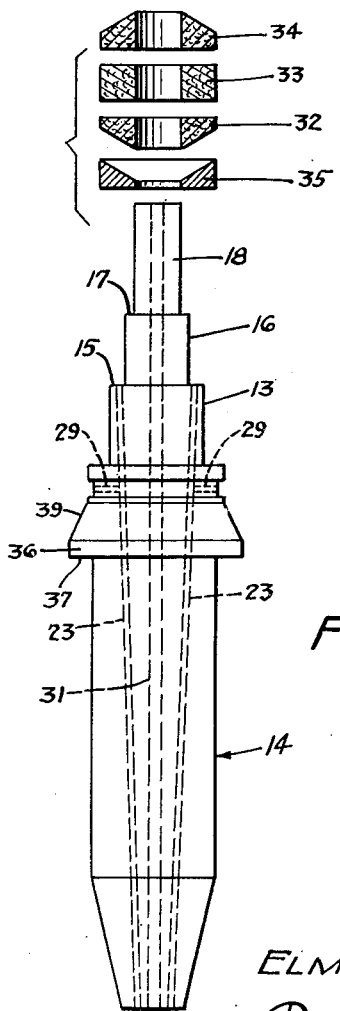
Fig. 2 is a view showing the torch tip removed from the torch head and also illustrating the sealing means provided within the torch head.

In the selected embodiment of the invention herein disclosed, there is illustrated in Figure 1, for purposes of disclosure, a torch head generally designated by the numeral 2. The torch head is of more or less conventional design and has a chamber 3 therein provided at its inner end with a reduced bore 4, shown surrounded by an annular seat 5 which preferably is conical in shape.

A conduit 6 has one end secured in the head 2 and is in communication with one end of a passage 7 whose opposite end is in communication with the bore 4, as clearly illustrated in Figure 1. The opposite end of conduit 6 is connected to a suitable supply of high pressure oxygen, the supply of which is controlled by suitable valves constituting a part of the torch. As these parts are well known and understood in the art, they have been omitted from the drawings.

Cutting torches such as herein disclosed are usually provided with means for pre-heating the work prior to starting the cutting operation, and means is therefore provided for delivering a pre-heating fuel mixture to the tip of the torch. This fuel mixture is usually composed of measured quantities of acetylene and oxygen.

As shown in Figure 1, a sleeve or bushing 11 is received in threaded engagement with the wall of the chamber 3 of the head, and has a bore 12 adapted to slidably and snugly receive a cylindrical portion 13 of a torch tip, generally designated by the numeral 14. The cylindrical portion 13 terminates at its inner end in a shoulder 15 and the relatively smaller cylindrical portion 16 extends from the shoulder 15 to a shoulder 17 which defines one end of a reduced cylindrical portion 18 forming a part of the tip, and which also constitutes a part of the present invention. The length of the end portion 18 is such that when the tip is secured in position in the torch head, the inner terminal of said end portion 18 is received in the reduced bore 4, as clearly illustrated in Figure 1.

Figure 3:
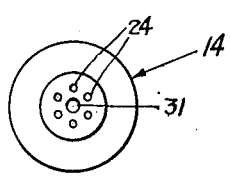
Figure 3 is an end view of the tip only, showing the pre-heating and cutting orifices.

Low pressure oxygen is delivered into an annular chamber 19 from the conduit 8 and flows through an annular restricted passage 21 into a distributing chamber 22 which is in communication with the inner ends of a plurality of fuel passages 23. The fuel passages 23, as shown in Figure 1, extend from the chamber 22 to the outer end of the tip where they terminate in a plurality of annularly spaced pre-heating orifices 24, as best illustrated in Figure 3.

Low pressure acetylene is delivered to the pre-heating fuel ducts 23 from the conduit 9 which is in communication with an annular chamber 25 through a passage 26. From the chamber 25 the low pressure acetylene passes through a restricted annular passage 27 into an annular chamber 28 which is in communication with the fuel passages 23 through a series of small radial ducts 29. The restricted passages 21 and 27 serve to equalize the pressure in the annular chambers 22 and 28, whereby the supplies of low pressure oxygen and acetylene to the fuel ducts 23 will be uniform.

Suitable valves, not shown, are provided for controlling the flow of low pressure oxygen and acetylene to the fuel passages 23, as is well known.

One of the important features of the present invention resides in the means provided for preventing the high pressure oxygen delivered into the bore 4 from the conduit 6 from leaking into the annular low pressure chamber 19 during the cutting operation. As shown in Figure 1, the torch tip has an enlarged central passage 31 which extends the full length of the tip and has its inner end in communication with the reduced bore 4, whereby when high pressure oxygen is permitted to flow through the conduit 6 by manipulation of the usual control valve, not shown, such oxygen will flow through the central passage 31 to the pre-heated work, where it is ignited to effect the cutting operation.

The means provided for thus preventing leakage within the torch head is shown comprising a plurality of annular sealing elements 32, 33 and 34, the latter being seated against the seat 5, and the sealing element 32 being seated against a backing washer or member 35 mounted upon the reduced cylindrical end portion 18 of the tip and seated against the shoulder 17. The sealing elements 32, 33 and 34 are constructed of a suitable flexible or more or less compressible heat-resistant material, which is impervious to the gases passing through the torch head, and when compressed between the seat 5 and the backing member 35, completely and thoroughly prevent all danger of leakage of the high pressure oxygen from the bore 4 around the outside of the reduced end portion 18 into the annular low pressure chamber 19.

The torch tip is shown provided with the usual enlarged collar 36 which in the present instance is shown integrally formed therewith, although it is to be understood that it may be otherwise formed, if desired. The collar 36 has an annular shoulder 37 adapted to be engaged by the usual securing nut 38 which serves to firmly secure the tip in position in the torch head. The inwardly directed conical face 39 of the collar 36 is engaged with a seat 41 to prevent leakage of the low pressure fuel gases from the annular chamber 28, as will be understood by reference to Figure 1.

It is to be understood that the parts are so fashioned that the sealing elements 32, 33 and 34 are firmly compressed to prevent leakage around the reduced end portion 18 of the tip when the collar 36 engages the seat 41.

To remove the tip from the torch head, the nut 38 is unscrewed from the head after which the tip may be withdrawn from the head, as will be understood, the sealing elements 32, 33 and 34 and the backing member or collar 35 remaining within the torch head because of the sleeve 11 secured therein.

The novel sealing means herein disclosed has been found extremely simple and inexpensive to manufacture and provides a perfect seal. The compressibility of the sealing elements 32, 33 and 34 assures a leak-proof connection between the collar 36 and the seat 41, with the assurance that the sealing elements are sufficiently compressed to prevent leakage of the high pressure oxygen into the low pressure fuel chamber 19.

It is also to be noted that the sealing elements cannot become separated from the head 2 when the torch tip is removed therefrom, and they are so positioned within the head that they cannot become displaced when the tip is detached from the head. Thus, if for any reason it becomes necessary to remove the tip from the head, the tip may be quickly removed and again secured in position in the head with the assurance that the high pressure oxygen passage or bore 4 will be completely and thoroughly sealed against leakage, whenever the tip is secured in position in the torch head 2, as shown in Figure 1.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A torch head having an enlarged chamber therein terminating at its bottom in a reduced axial bore, an annular seat surrounding said reduced bore, a relatively larger seat at the open end of the chamber, means for supplying high pressure cutting oxygen to the bore, a tip having a body portion received in said chamber and provided with a reduced cylindrical end portion having its periphery spaced from the cylindrical wall of the chamber to provide an annular packing space around the reduced end portion of the tip, an annular shoulder on the tip body defining one end of said reduced cylindrical end portion, an enlarged shoulder on the intermediate portion of the tip head, means for detachably securing the tip in the torch head with the inner end of its reduced end portion received in said reduced bore and with its enlarged shoulder engaging the seat in the open end of the torch head chamber, a cutting oxygen passage in the tip having one end in communication with the bore, an abutment member mounted on said reduced end portion of the tip and engaged with the shoulder thereof, a plurality of annular compressible sealing elements mounted on the reduced end portion of the tip between said seat and the abutment member, and the spacing between the shoulder on the reduced end portion of the tip and the enlarged shoulder on the tip body relative to the spacing between the seats in the chamber of the torch head being such that when the tip is inserted into the torch head and is secured therein, the sealing elements are firmly compressed against the walls of the space surrounding the inner reduced end portion of the tip, thereby to prevent leakage of the high pressure gases in the torch head.

2. A torch head having an enlarged chamber therein terminating at its bottom in a reduced axial bore, a seat surrounding said reduced bore and a second relatively larger seat at the open end of said chamber, means for supplying high pressure cutting oxygen to said reduced bore, a tip having a body portion received in said chamber and provided with a reduced cylindrical end portion having its terminal received in said reduced bore, the periphery of said reduced tip portion being spaced from the wall of the torch head bore to provide an annular packing space around said reduced tip portion, an annular shoulder on the reduced end portion of the tip portion spaced from the terminal thereof, a cutting oxygen passage extending lengthwise through the tip and having one end in communication with said reduced bore, an abutment member mounted on the reduced end portion of the tip and seated against said shoulder, said abutment member being axially spaced from the seat surrounding said reduced bore, a plurality of annular compressible sealing elements mounted on the reduced end portion of the tip between the abutment member and seat at the bottom of the cylindrical bore, an enlarged annular collar on the tip body adapted to engage the larger seat at the outer end of the torch head chamber, and a clamping nut for axially translating the tip in the torch head to secure it therein, and the spacing between the shoulder on the reduced end portion of the tip and the enlarged shoulder on the tip body, relative to the spacing between the seats in the chamber of the torch head, being such that when the tip is inserted into the torch head and the clamping nut is tightened to secure the tip therein, the sealing elements are firmly compressed against the walls of the space surrounding the inner reduced end portion of the tip, thereby to prevent leakage of the high pressure gases within the torch head.

ELMER H. SMITH.

REFERENCES CITED

The following references are of record in the file of this patent:

UNITED STATES PATENTS

| Number | Name | Date |
| --- | --- | --- |
| 1,194,769 | Neagley | Aug. 5, 1916 |
| 1,553,709 | Murray | Sept. 15, 1925 |
| 1,926,438 | Fausek et al. | Sept. 12, 1933 |
| 1,992,851 | Adams | Feb. 26, 1935 |
| 2,059,706 | Paasche | Nov. 3, 1936 |
| 2,176,813 | Hammon | Oct. 17, 1939 |
| 2,355,849 | Crowley | Aug. 15, 1944 |
| 2,417,650 | Kandel | Mar. 18, 1947 |

FOREIGN PATENTS

| Number | Country | Date |
| --- | --- | --- |
| 616,179 | France | Oct. 26, 1926 |